(12) United States Patent
Mahdi et al.

(10) Patent No.: US 8,778,128 B2
(45) Date of Patent: Jul. 15, 2014

(54) METHOD OF PRIMERLESS BONDING

(75) Inventors: Syed Zafar Mahdi, Rochester Hills, MI (US); Marcy Nicole Burris, Davisburg, MI (US); Michelle Marie Henderson, Macomb, MI (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 13/352,771

(22) Filed: Jan. 18, 2012

(65) Prior Publication Data

US 2013/0029074 A1 Jan. 31, 2013

Related U.S. Application Data

(63) Continuation of application No. 11/261,955, filed on Oct. 28, 2005, now abandoned.

(60) Provisional application No. 60/622,927, filed on Oct. 28, 2004.

(51) Int. Cl.
| | |
|---|---|
| C04B 37/00 | (2006.01) |
| C09J 4/00 | (2006.01) |
| C09J 101/00 | (2006.01) |
| C09J 201/00 | (2006.01) |
| B32B 27/36 | (2006.01) |
| C08G 77/00 | (2006.01) |
| C08G 18/00 | (2006.01) |

(52) U.S. Cl.
USPC .......... 156/325; 156/331.7; 428/412; 528/10; 528/44

(58) Field of Classification Search
USPC ............ 156/325, 331.7; 428/412; 528/10, 44
See application file for complete search history.

(56) References Cited

U.S. PATENT DOCUMENTS

| | | | |
|---|---|---|---|
| 4,539,345 A | 9/1985 | Hansen | |
| RE32,406 E | 4/1987 | Molari, Jr. | |
| 5,130,365 A | 7/1992 | Koishi et al. | |
| 5,489,409 A | 2/1996 | Koganezawa et al. | |
| 5,665,436 A | 9/1997 | Chitarra et al. | |
| 5,915,780 A * | 6/1999 | Kobrehel et al. | 296/146.15 |
| 6,265,029 B1 | 7/2001 | Lewis | |
| 6,399,211 B2 | 6/2002 | Lewis | |
| 6,536,930 B1 * | 3/2003 | Hirmer | 362/540 |
| 2002/0098361 A1 | 7/2002 | Bennett et al. | |
| 2003/0173026 A1 | 9/2003 | Wu et al. | |

FOREIGN PATENT DOCUMENTS

| | | |
|---|---|---|
| JP | 61/183312 | 9/1985 |
| JP | 6253337 A | 3/1987 |
| JP | 06073198 | 3/1994 |
| JP | 7-068620 A | 3/1995 |
| JP | 11-320797 | 11/1999 |
| JP | 2000059083 | 2/2000 |
| JP | 2001/192242 | 7/2001 |
| JP | 2001/205742 | 7/2001 |
| JP | 2005/519183 A | 6/2005 |
| KR | 10-1991-0002084 B1 | 4/1991 |
| WO | WO 01/26924 | 4/2001 |
| WO | WO 01/44311 | 6/2001 |
| WO | WO 02/081899 | 10/2002 |
| WO | WO 03/016685 | 2/2003 |
| WO | WO 03/048067 | 6/2003 |
| WO | 03/076546 | 9/2003 |

OTHER PUBLICATIONS

Patent Abstracts of Japan—Korean Patent Application No. 10-2007-7009683; Date of Filing Aug. 30, 1985; Bonding Method; Ono Kiyoshi.
International Search Report and Written Opinion for PCT/US3005/039219.
Office Action in EP Application 05825086.1 dated Nov. 18, 2009.
Office Action in EP Application 05825086.1 dated Oct. 12, 2012 from 2001.
Office Action in EP Application 05825086.1 dated Oct. 12, 2012 from 2906.
Office Action in CA Application 2,581,874 dated Nov. 27, 2012.
JP Office Action in JP2007-539235 dated Sep. 25, 2012.
JP Final Rejection in JP2007-539235 dated Jan. 23, 2013.
Korean Office Actions in 10-2007-7009683.

* cited by examiner

*Primary Examiner* — Michael Orlando
(74) *Attorney, Agent, or Firm* — The Dobrusin Law Firm, PC

(57) ABSTRACT

The present invention relates to methods for attaching a plastic component to another component where the plastic component is bonded to the other component with an adhesive in the absence of a primer on the plastic component and the adhesive is substantially solvent free. In one embodiment, a coated transparent or translucent polycarbonate substrate is connected to a frame with a polyurethane adhesive containing silicon in the absence of a primer on the substrate; or with a substantially solvent free adhesive. The inventions also related to bonded articles made according to the disclosed methods.

17 Claims, No Drawings

US 8,778,128 B2

METHOD OF PRIMERLESS BONDING

CLAIM OF PRIORITY

This application is a continuation of Ser. No. 11/261,955 filed Oct. 28, 2005 now abandoned which claims benefit of the filing date of Provisional Application No. 60/622,927, filed on Oct. 28, 2004 all of which are incorporated herein by reference.

FIELD OF THE INVENTION

The present invention relates to a method of adhesively bonding two or more components. More particularly, the method may be used to bond at least one coated plastic component to another component. The invention also relates to articles bonded by this system.

BACKGROUND OF THE INVENTION

Adhesives have been used extensively to join components of an overall article. However, known adhesive systems present several drawbacks. In particular, many traditional adhesives have difficulty in bonding different materials together (e.g., plastic to metal or two different types of plastic).

Primers or adhesion promoters have been used in the past to treat a surface to promote bonding. Primers have several drawbacks. For example, primers may degrade the integrity or quality of their corresponding workpiece. For example, application of a primer to a coated or painted substrate may degrade or destroy the coating or paint. In one particular case, solvent in the primer (or adhesive) composition may cause crazing or delamination of the coating or paint on a plastic component. The use of solvents also leads to issues of disposal and/or reclamation of the solvent after use. The use of solvents often requires the use of heat to drive off the solvent to affect drying or curing of the adhesive.

The inventors have recognized solutions to one or more of these problems.

SUMMARY OF THE INVENTION

The present invention relates to methods for attaching a plastic component to another component where the plastic component is bonded to the other component with an adhesive in the absence of a primer on the plastic component, or with a substantially solvent free adhesive. In one embodiment, a coated transparent or translucent polycarbonate substrate is connected to a frame with a polyurethane adhesive in the absence of a primer on the substrate; or with a substantially solvent free adhesive. The inventions also related to bonded articles made according to the disclosed methods.

DETAILED DESCRIPTION OF THE INVENTION

The present invention relates to bonding at least a first component and a second component together using a substantially solvent free adhesive or an adhesive in the absence of a primer on at least one of the components. In one embodiment, an adhesive that is substantially solvent free may be used to bond a first component to a second component. In another embodiment, an adhesive may be used to bond a first component to a second component using an adhesive in the absence of a primer on the first component. In a preferred embodiment, a primerless first component is used in combination with a substantially solvent free adhesive.

The first component is typically made of plastic, although this is not necessarily the case, and may include a thermoplastic, a thermoset, a rubber, an elastomer, or combinations thereof. Reinforced, un-reinforced, filled and unfilled plastics may also be used for the component.

Preferred polyamides, polystyrenes, polyesters, vinyls, acrylics, methacrylics, acrylonitriles, polyolefins, polycarbonates, or mixtures thereof. More preferably, the material is selected from acrylics and polycarbonates.

In one preferred embodiment, the material of the first component is a transparent or translucent polycarbonate and may be formed using any suitable technique (e.g. rolling, extrusion, molding, etc.). In one embodiment, Reaction injection molding (RIM) is utilized. Further, the material may contain one or more additives such as a tint, a colorant, scratch resistors, UV & heat absorbers, adhesion promoters and combinations thereof.

The first component may be coated with one or more coatings, such as a tint, a hard-coating, a polarizing coating, a scratch resistant coating, a chemical resistant coating, a reflective coating, a radiation absorbing coating (e.g. a UV coating), combinations thereof, or the like. Preferably, the polycarbonate is coated with coatings that improve its hardness, strength and/or radiation resistance without substantially obfuscating the transparency or translucency of the polycarbonate and without readily crazing, flaking, peeling, or delaminating from the component under adverse temperature or pressure conditions or chemical environments. In one preferred embodiment, the first component further comprises an opaque band or area around the perimeter of the component while the remainder of the component continues to be transparent or translucent.

The second component may be the same material as the first component. Otherwise, the second component may be made of any suitable material, including metals (e.g. steel), alloys, composites, ceramics, laminates, plastics as described above, combinations thereof or the like.

The second component may include one or more surface treatments such as the coatings discussed above. In addition, the second component may also be coated with a primer or a paint.

In one embodiment, the surfaces of each of the components may optionally undergo a preliminary treatment prior to the application of the coatings, adhesives or primers. This optional treatment may include cleaning and degreasing, plasma coating, coating with another surface treatment (e.g. a paint), and combinations thereof.

The adhesive used to bond the components together may be any suitable adhesive for the intended application. It may be a water based adhesive, a solvent based adhesive or otherwise. It may be a single component adhesive or a multi-component adhesive (e.g., a two-component adhesive). The multi-component adhesive may use the components simultaneously (e.g. an epoxy) or sequentially. It may be air cured, moisture cured, heat cured, radiation cured (e.g., IR or UV), radio frequency cured, solvent loss cured, or otherwise cured. It may be a melt flowable, a liquid, a film, a powder, a paste, a tape, a foam, a gel or otherwise. It may be a pressure sensitive, an RTV adhesive, or a hot-melt adhesive. It may be a structural adhesive in certain applications. It should be recognized that the use of the term adhesive herein is not intended to foreclose primers or other bonding agents from the scope of the present invention.

Any adhesive that after cure can withstand the conditions of use of a vehicle window (e.g., for an automobile windshield) can be used. Preferably such adhesive does not decompose or delaminate at temperatures between about −40° C. and about 150° C. Though not critical, in one embodiment, the adhesive has a resulting tensile strength of at least about 70 psi (about 500 kPa), more preferably about 145 psi (about 1 MPa), still more preferably about 420 psi (about 3 MPa). In some applications, the resulting tensile strength may be as high as about 4000 psi (about 28 MPa), more preferably at least about 6500 psi (about 45 MPa), and still more preferably at least about 9000 psi (62 MPa). It will be appreciated that in some applications, the strength of the adhesive may be greater than the strength of at least one, and preferably more than one, of the individual joined components.

Preferably the adhesives used will create joints that have lap shear strengths of about at least 300 psi; more preferably the joints will have lap shear strengths of about at least 400 psi; most preferably the joints will have lap shear strengths of about at least 500 psi or more. Such lap shear strengths provide joints that have sufficient strength to be useful in windshields of automobiles.

It will further be appreciated that a preferred adhesive is able to withstand exposure to water or cleaning solutions. Optionally, the adhesive may also be able to withstand exposure to hydrocarbon materials (e.g., natural or synthetic oils), calcium chloride, brake fluid, glycol coolants and the like, at the above-mentioned temperatures and the pressures.

In another embodiment, the adhesive may be a cure-on-demand adhesive, requiring a separate operation to cause the adhesive to begin to cure. In one embodiment this is achieved by using an encapsulated curing agent that is ruptured during assembly. In another embodiment this is achieved by removing a protective coating to expose the adhesive to ambient conditions. Cure can be initiated by exposing the adhesive to heat, infrared or ultraviolet light sources, or to shearing forces and the like. Of course, it is always possible to employ an adhesive that does not have cure on demand capability.

An adhesive selected from any suitable adhesive family may be employed such as polyesters, polyamides, polyurethanes, polyanthuses, polyethers, polyolefins, epoxies, ethylene vinyl acetates, urethanes, acrylics, silanes, thioethers, fluorosilicones, fluorocarbons, combinations thereof or the like. The adhesive may be a high temperature epoxy resin, a high temperature acrylic resin, a polyimide, a hybrid polyimide/epoxy resin adhesive, an epoxy novolac/nitrile rubber adhesive, a polythioether epoxy or the like. Exemplary compositions for possible adhesives are disclosed in a patent application titled, "Amine Organoborane Complex Polymerization Initiators and Polymerizable Compositions", PCT Publication No. WO 01/44311 A1, U.S. Ser. No. 09/466,321, herein incorporated by reference.

High temperature acrylic resin adhesive means an adhesive wherein the primary component is an acrylic resin that when cured can withstand exposure to the temperatures mentioned above without decomposing or delaminating from the component. Preferable polyurethane adhesives may include a silicon (e.g., siloxane) admixed with the polyurethane or polyurethane-silicon moieties. More preferable polyurethane adhesives include silyl-terminated polyurethanes, and the most preferred adhesives include siloxane grafted to a polyurethane backbone. Preferred polyurethane adhesives include those sold under the tradename BETASEAL™ by Dow Chemical. Preferred polyether adhesives include silyl-terminated polyethers, such as those sold under the tradename Kaneka MS polymer.

In one embodiment, the adhesive may be substantially free of solvents during bonding to the first plastic component. A substantially solvent free adhesive may be utilized. Alternately, the adhesive may be become substantially solvent free after application to the second component. For example, the solvent may be allowed to evaporate in ambient conditions or driven off using elevated temperatures, reduced pressure, air movement, or combinations thereof. Further, the adhesive may be allowed to partially cure (e.g. solvent loss cure) to remove any solvent that may be present. Solvents include any liquids that act to disperse the adhesive uniformly within its volume. Solvents may be organic or inorganic, polar or non polar, and may have any vapor pressure.

Preferably, the adhesive is substantially free of any solvents that cause any crazing or delamination of a coating on the first plastic component. Also, the adhesive is preferably free any solvent that obfuscates the translucency or transparency of the first plastic component, whether coated or uncoated.

Preferred substantially solvent free adhesives contain less than about 50 percent by weight solvent, more preferred adhesives contain less than about 25 percent by weight solvent, more preferred yet, the adhesive contains less than about 15 percent by weight solvent, still more preferred, the adhesive contains less than about 10 percent by weight solvent, while a more preferred adhesive contains less than about 5 percent by weight solvent, and the most preferred adhesive contains less than about 1 percent by weight solvent. Preferably, the weight percentage of solvent is measured at the time of application, but it may also be measured at the time of bonding of the two components together.

In one aspect, a plasticizer may be used to lower the viscosity of the adhesive or to otherwise improve the flowability of the adhesive. This aids in the application of the adhesive without the need for using a solvent. Suitable plasticizers include phthalates.

In one embodiment, a first coated plastic component, in the absence of a primer on the first component, is bonded to a second component with an adhesive that is substantially solvent free at the time of application. Such a combination limits the amount of solvent that contacts the coating on the first plastic component by eliminating the primer on the first component and significantly limiting the amount of solvent present in the adhesive. The reduction in the amount of solvent increases the quality of the resultant bonded components because crazing and/or delamination of the coating on the first component is reduced or eliminated. Even if delamination is not reduced or eliminated, the reduction in the amount of solvent has other advantages such as reducing the cost of disposal or reclamation of the solvent and reducing the cost of production through the elimination of solvent removal processes.

The adhesive may be applied to the mating surface of the plastic component, the second component, or both by any suitable method (e.g. spraying, brushing, rolling, dipping, swabbing, and combinations thereof).

In one embodiment, a bead of adhesive is placed (e.g., by pumping) on the respective mating surface of at least one of the components and the opposing mating surface is brought into contact with it. The assembly is then cured. In another embodiment, the adhesive is pre-coated (e.g., by spraying, dipping, brushing, swabbing, pasting or the like) on one or both of the mating surfaces of the respective components and then the components are joined and cured. Any other suitable joining technique may likewise be employed. Preferably the amount of adhesive employed is sufficient to achieve the desired performance characteristics of the assembly. Such amount will vary from application to application. They are also contemplated to be employed for re-assembly of a repaired assembly or in the replacement of a component.

Mechanical fasteners such as rivets, nuts and bolts, welds, and the like may be used in conjunction with the adhesive to secure the components together.

The present invention also relates to articles manufactured by the disclosed processes of bonding two or more adhesively bonded components. In a preferred embodiment such articles include a coated transparent or translucent vehicle window that is bonding to a coated metal window frame. Preferably, the second component is a frame adapted to receive a transparent or translucent polycarbonate where the frame is coated with primer. The articles also include a lens adhesively bonded to a frame, a structural panel adhesively bonded to a frame, a shield bonded to a frame, combinations thereof, or the like. Once bonded together, the components may form an assembly for use on, in, or as part of a window, shield, lens, or structure and more particularly, an assembly for use in a vehicle. Within the vehicle, the assembly may include a windshield, a moon roof, a window, or the like. Additionally, the bonded components may form a transparent or translucent protective barrier used to protect users from physical, chemical, and biological hazards. In particular, the bonded components may form a shield on a protective helmet or suit, a shield on an industrial machine, a shield, a reaction vessel, or a window into a new reaction vessel. In one embodiment, the article manufactured by disclosed methods is completely or substantially free of crazing or delamination of any coating on the plastic substrate. For example, a preferred article is a coated polycarbonate window in metal frame that is substantially free of crazing or delamination of the coating on the polycarbonate window.

The present invention also relates to methods of using assemblies of components that include a joint that has been prepared using a substantially solvent free adhesive disclosed herein. In particular, the methods include operating a vehicle window at conditions above about 500 psi (about 3 MPa), more preferably up to about 600 psi (about 4 MPa), and most preferably above about 700 psi (about 5 MPa).

EXAMPLES

The following examples are provided to more fully illustrate the invention, and are not intended to limit the scope of the claim. Unless otherwise stated, all parts and percentages are by weight.

Primerless polyurethane adhesives were compared with adhesives used in combination with primers. Lap shear adhesion testing was conducted in accordance with the SAE J1529 test method and the quick knife adhesion testing was conducted in accordance with the SAE J1720 test method.

For the lap shear test, an adhesive bead approximately 6.3 mm wide by 8 mm high is applied along the width of a Lexamar polycarbonate window with a GE AS4700 silicon based hardcoat (25 mm×75 mm) and approximately 6 mm to 12 mm from the end. An e-coated metal substrate is placed on the adhesive and the sample is allowed to cure at the condition of the 23° C. and 50 percent relative humidity for 3 to 7 days. After the cure, the sample was subjected to lap shear testing or to further weathering conditions.

One type of weathering was a wet cycle which included subjecting the sample to 88° C. for 24 hrs, followed by condensing humidity for 24 hrs, followed by −29° C. for 24 hrs. This cycle was repeated for a total of 5 times, after which the sample was subjected to lap shear testing. A Weather-O-Meter (WOM) chamber was utilized. SAE J1885 conditions are used for the testing chamber unless specified otherwise.

The other type of weathering was a dry cycle which included subjecting the sample to a heated water bath at 70° C. for 7 days, where the sample is wrapped in cotton wool and sealed in a polyethylene bag. Next, the sample is placed in a freeze for 16 hrs at 20° C., after which the sample is allowed to stand at room temperature for 2 hrs. This cycle is repeated for a total of five times, after which the sample was removed from the bag and subjected to the lap shear test.

Five different adhesive systems were compared; two utilizing a primer on the polycarbonate substrate and three primerless adhesives. BETASEALT™ 57302 is a polyurethane adhesive that does not contain silane. This adhesive was used with a two step primer in the form of BETASEAL™ 43518, which is a clear primer in a solvent, and BETASEAL™ 43520A, is a black primer in a solvent. BETASEAL™ 57302 was also used with a step primer in the form of BETAPRIME™ 5500 is a one step glass primer in a solvent. BETASEAL™ 58402 is polyurethane pre-polymer copolymerized with silane. BETASEAL™ 15625 and 16000 are Polyurethane adhesives contain polyurethane pre-polymer grafted with amino silanes. BETASEAL™ 16000 also heat contain heat stabilizers, whereas, 15625 does not. The last three adhesives are used without primers and are also solvent-free.

The lap shear test was conducted at a pull rate of 1 inch/minute (2.5 cm/min) with an Instron Tester. Five samples of each adhesive system were carried out in each set of conditions: 1) initial cure; 2) wet cycle; and 3) dry cycle. The results of the lap shear testing of the five samples for each adhesive system were averaged and are reported in Table 1.

TABLE 1

Lap Shear Testing

| Adhesive | Primer | Initial (PSI) | Wet Cycle (PSI) | Dry Cycle (PSI) | Mode of Failure |
|---|---|---|---|---|---|
| BETASEAL ™ 57302 | BETASEAL ™ 43518/43520A | 709 | 561 | 672 | 100 CF (5 of 5) |
| BETASEAL ™ 57302 | BETAPRIME ™ 5500 | 744 | 697 | 618 | 100 CF (5 of 5) |
| BETASEAL ™ 58402 | None | 600 | 590 | 569 | 100 CF (4 of 5) |
| BETASEAL ™ 15625 | None | 429 | 613 | 597 | 100 CF (4 of 5) |
| BETASEAL ™ 16000 | None | 401 | 637 | 444 | 100 CF (5 of 5) |

The primerless adhesives showed an absence of crazing and showed lap shear strengths that were comparable to the lap shear strengths of primed adhesives. Furthermore, all the adhesives showed similar modes of failure in the form of cohesive failure for the majority of the samples. Only 1 sample from each of the primerless adhesives BETASEAL™ 58402 and BETASEAL™ 15625 showed any substrate failure.

For the quick knife adhesion testing, a 6.3 mm (width)×6.3 mm (height)×100 mm (length) bead of adhesive is placed on a Lexamar polycarbonate window with a GE AS4700 hardcoat and the adhesive is cured for a specific time in the condition of 23° C. and 50 percent relative humidity. The cured bead is then cut with a razor blade through to the substrate at a 45° angle while pulling back the end of the bead at 180° angle. Notches are cut every 3 mm on the substrate. The degree of adhesion is evaluated as cohesive failure (CF) or substrate failure (CF-SB). In case of CF, separation occurs within the adhesive as a result of cutting and pulling, while in CF-SB, the substrate fails. The same adhesive/primer combinations and primerless adhesives used for the lap shear test were used for the quick knife adhesion testing, as were the same weathering conditions. One sample of each adhesive and weathering conditions were subjected to the quick knife adhesion test. The results are summarized below in Table 2.

TABLE 2

Quick Knife Adhesion Testing

| Adhesive | Primer | Weathering conditions | Mode of Failure |
|---|---|---|---|
| BETASEAL ™ 57302 | BETASEAL ™ 43518 & 43520A | Initial | 40% CF, 60% CF-SB |
| | | Wet Cycle | 60% CF, 40% CF-SB |
| | | Dry Cycle | 100% CF |
| BETASEAL ™ 57302 | BETAPRIME ™ 5500 | Initial | 70% CF, 30% CF-SB |
| | | Wet Cycle | 80% CF, 20% CF-SB |
| | | Dry Cycle | 85% CF, 15% CF-SB |
| BETASEAL ™ 58402 | None | Initial | 20% CF, 80% CF-SB |
| | | Wet Cycle | 20% CF, 80% CF-SB |
| | | Dry Cycle | 90% CF, 10% CF-SB |
| BETASEAL ™ 15625 | None | Initial | 30% CF, 70% CF-SB |
| | | Wet Cycle | 80% CF, 20% CF-SB |
| | | Dry Cycle | 50% CF, 50% CF-SB |
| BETASEAL ™ 16000 | None | Initial | 100% CF |
| | | Wet Cycle | 100% CF |
| | | Dry Cycle | 100% CF |

The results of the quick knife adhesion testing show similar modes of failure for the adhesive/primer combinations and two of the primerless adhesives, indicating that the primerless adhesives performed as well as the primer/adhesive combinations. Namely, both kinds of samples showed failure of the substrate to a similar degree. One primerless adhesive showed markedly better mode of failure than the remaining samples. The 100% CF results of the BETASEAL™ 16000 indicate there was no failure of the substrate with this adhesive under any of the weathering conditions.

Overall, the lap shear strength testing and the quick knife adhesion testing show that the primerless adhesives perform as well as primer/adhesive combinations. These similar results are an improvement because the use of solvents was avoided without a deterioration in performance.

It will be further appreciated that functions of a plurality of components or steps may be combined into a single component or step, or the functions or structures of one step or component may be split among plural steps or components. The present invention contemplates all of these combinations. Unless stated otherwise, dimensions and geometries of the various structures depicted herein are not intended to be restrictive of the invention, and other dimensions or geometries are possible. Plural structural components or steps can be provided by a single integrated structure or step. Alternatively, a single integrated structure or step might be divided into separate plural components or steps. In addition, while a feature of the present invention may have been described in the context of only one of the illustrated embodiments, such feature may be combined with one or more other features of other embodiments, for any given application. It will also be appreciated from the above that the fabrication of the unique structures herein and the operation thereof also constitute methods in accordance with the present invention. The present invention also encompasses intermediate and end products resulting from the practice of the methods herein. The use of "comprising" or "including" also contemplates embodiments that "consist essentially of" or "consist of" the recited feature.

The explanations and illustrations presented herein are intended to acquaint others skilled in the art with the invention, its principles, and its practical application. Those skilled in the art may adapt and apply the invention in its numerous forms, as may be best suited to the requirements of a particular use. Accordingly, the specific embodiments of the present invention as set forth are not intended as being exhaustive or limiting of the invention. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated by reference for all purposes.

What is claimed is:

1. A method for attaching a first coated plastic component to a second component comprising:
   directly bonding the first coated plastic component comprising a transparent or translucent polycarbonate having a hard coating or scratch resistant coating deposited thereon to the second component with an adhesive comprising a polyurethane prepolymer grafted with siloxane in the absence of a primer on the first coated component, wherein the bonding forms a bond between the first coated component and the second component, and wherein the hard coating or scratch resistant coating comprises silicon.

2. The method of claim 1, wherein the adhesive contains less than 1 percent by weight of solvent.

3. The method of claim 1, wherein the adhesive is cured by moisture.

4. The method of claim 3, wherein the second component further comprises a surface treatment.

5. The method of claim 4, wherein the surface treatment comprises a primer.

6. The method of claim 5, wherein the bond between the first coated component and the second component comprises a lap shear strength of about at least 400 psi.

7. A method for attaching a coated polycarbonate substrate to a frame comprising:
   connecting a polycarbonate substrate that is at least partially transparent or translucent coated with a hard coat or a scratch resistant coating to a frame with a polyurethane adhesive comprising a polyurethane prepolymer grafted with siloxane in the absence of a primer on the substrate, wherein the adhesive contains 1 percent by weight or less of solvent; and curing the adhesive, wherein the adhesive is cured by moisture, wherein the cured adhesive forms a direct bond between the coated polycarbonate substrate and the frame; and wherein the hard coat or the scratch resistant coating comprises silicon.

8. The method of claim 7 wherein the cured bond between the coated polycarbonate substrate and the frame comprises a lap shear strength of about at least 400 psi after 15 days or more of undergoing weathering conditions.

9. The method of claim 8, wherein the frame comprises a vehicle window frame.

10. An adhesively bonded article comprising:
   a. a hard coated polycarbonate substrate that is at least partially transparent or translucent;
   b. a frame; and
   c. a polyurethane adhesive cured by moisture,
   wherein the hard coated polycarbonate substrate is directly bonded to the frame using the adhesive comprising a polyurethane prepolymer grafted with siloxane in the absence of a primer on the hard coated substrate, and wherein substrate's hard coat comprises silicon.

11. The article of claim 1, wherein the hard coated polycarbonate further comprises a vehicle window and the frame further comprises a vehicle window frame.

12. The method according to claim wherein the prepolymer is grafted with amino silane.

13. The method according to claim 1 wherein the adhesive further contains a heat stabilizer.

14. The method according to claim 7 wherein the prepolymer is grafted with amino silane.

15. The method according to claim 7 wherein the adhesive further contains a heat stabilizer.

16. The article according to claim 10 wherein the prepolymer is grafted with amino silane.

17. The article according to claim 10 wherein the adhesive further contains a heat stabilizer.

* * * * *